(12) United States Patent
Ferguson et al.

(10) Patent No.: US 8,490,996 B2
(45) Date of Patent: Jul. 23, 2013

(54) SHOCK-ABSORBING HANDLEBAR MOUNT

(76) Inventors: Ryan Ferguson, Morgantown, IN (US);
Tony Zupancic, Morgantown, IN (US)

(*) Notice: Subject to any disclaimer, the term of this patent is extended or adjusted under 35 U.S.C. 154(b) by 0 days.

(21) Appl. No.: 13/484,354

(22) Filed: May 31, 2012

(65) Prior Publication Data
US 2012/0304804 A1    Dec. 6, 2012

Related U.S. Application Data

(60) Provisional application No. 61/519,825, filed on May 31, 2011.

(51) Int. Cl.
*B62K 21/14*    (2006.01)
(52) U.S. Cl.
USPC ............................. 280/276; 280/279; 74/551.2
(58) Field of Classification Search
USPC .......................................... 74/551.2; 280/276
See application file for complete search history.

(56) References Cited

U.S. PATENT DOCUMENTS

| | | |
|---|---|---|
| 2,583,947 A | 11/1948 | Keetch |
| 5,511,444 A | 4/1996 | Clausen et al. |
| 5,685,201 A | 11/1997 | Renshaw |
| 6,035,741 A | 3/2000 | Krizman, Jr. |
| 6,325,402 B1 | 12/2001 | Gogo et al. |
| 6,371,263 B1 | 4/2002 | Hoose |
| 6,712,541 B1 | 3/2004 | Henricksen |
| 7,018,126 B2 | 3/2006 | Henricksen |
| 2002/0074770 A1 | 6/2002 | Lane |
| 2005/0066766 A1 | 3/2005 | Truchinski |
| 2005/0247160 A1 | 11/2005 | Ha et al. |
| 2006/0163831 A1 | 7/2006 | Henrickson |

OTHER PUBLICATIONS

Motosport.com; catalog; 1 page; published on World Wide Web prior to May 31, 2011.

*Primary Examiner* — Tony Winner
(74) *Attorney, Agent, or Firm* — Liell & McNeil

(57) ABSTRACT

A shock-absorbing handlebar mount includes a yoke assembly, and a first and a second clamping mechanism coupled to the yoke assembly and configured to attach the handlebar mount to a steering stem in an off-road vehicle. Each of the clamping mechanisms includes an upper and a lower clamping block, and an upper and a lower shock absorber. The first and second clamping mechanisms each further include a bolt extending through the blocks and shock absorbers, and being rotatable to clamp the steering stem between the corresponding blocks. Each clamping mechanism further includes an alignment key coupling together the corresponding blocks to inhibit non-axial displacement thereof, such that shearing forces on the shock absorbers are reduced or eliminated.

19 Claims, 2 Drawing Sheets

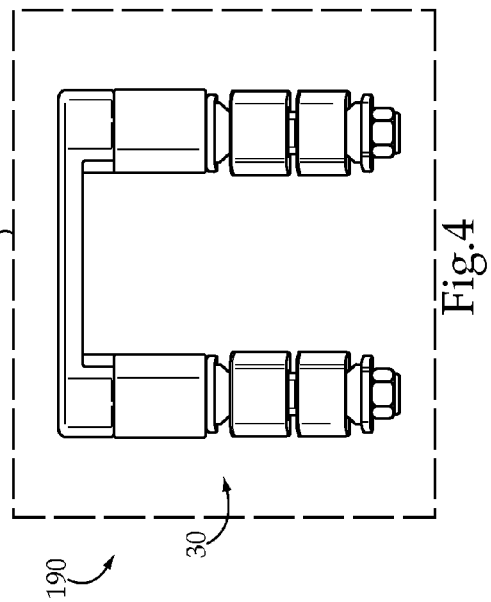
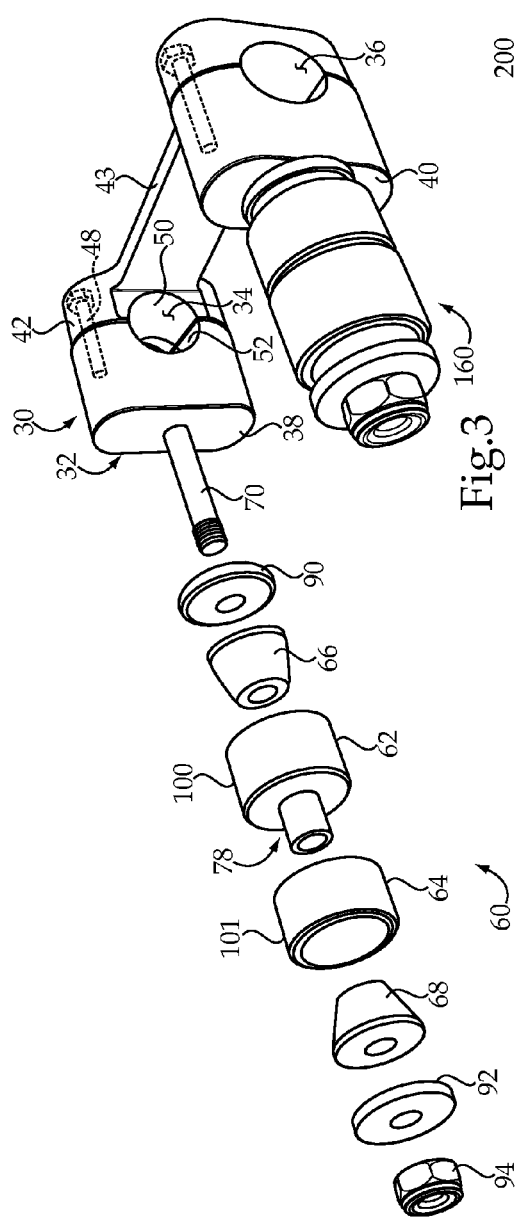

SHOCK-ABSORBING HANDLEBAR MOUNT

CROSS-REFERENCE

This application claims the benefit of the filing date of U.S. Provisional Patent Application Ser. No. 61/519,825, filed May 31, 2011.

TECHNICAL FIELD

The present disclosure relates generally to steering systems in off-road vehicles, and relates more particularly to a shock-absorbing handle bar mount for use in such a steering system, and having an alignment key coupling together upper and lower clamping blocks abutting opposite sides of a steering stem.

BACKGROUND

Off-road vehicular recreation tends to subject both the equipment and riders to substantial stress. Starting, stopping, bumps and dips and turns can all transmit forces between the rider and the vehicle. Vibrations from traveling over rough terrain, and even from the vehicle's engine, are virtually continuous. As a result, riders often experience substantial fatigue in a well known manner. Vehicular shocks, hand grips, and cushioned gloves can help ease shocks and vibrations, and increase rider comfort thereby reducing fatigue.

U.S. Pat. No. 6,712,541 to Henricksen is directed to an intermediate device that clamps the front suspension of a vehicle as part of the steering system attaching to the frame structure. The device provides a mounting area for the handlebar and controls, and incorporates dampeners above and below a clamping plane apparently for reducing vibration. While the Henricksen design may indeed provide advantages over stiffer interconnections between the handlebars and vehicle, the device appears fairly complex and would likely be expensive to manufacture.

SUMMARY

In one aspect, a shock-absorbing handle bar mount for an off-road vehicle includes a yoke assembly defining a pair of coaxial bores configured to receive a tubular section of a handlebar. The mount further includes a first and a second clamping mechanism coupled to the yoke assembly and configured to attach the handlebar mount to a steering stem in the off-road vehicle. The first and second clamping mechanisms each include an upper and a lower clamping block positionable in abutment against an upper and a lower side of the steering stem, respectively, an upper shock absorber positioned between the corresponding upper clamping block and the yoke assembly, and a lower shock absorber. The first and second clamping mechanisms each further include a bolt extending through the corresponding upper and lower clamping blocks and upper and lower shock absorbers, each of the bolts defining a clamping axis extending between a first bolt end coupled to the yoke assembly, and a second bolt end, and being rotatable to clamp the steering stem between the corresponding upper and lower clamping blocks. The first and second clamping mechanisms each further include an alignment key coupling together the corresponding upper and lower clamping blocks to inhibit non-axial displacement thereof.

In another aspect, a steering system for an off-road vehicle includes a steering stem configured to couple with a linkage for steering front wheels of the off-road vehicle, and having an upper and a lower side. This system further includes a handlebar, and a mount including a yoke assembly coupled to the handlebar, and a first and a second clamping mechanism attaching the yoke assembly to the steering stem. The first and second clamping mechanisms each include an upper and a lower clamping block, an upper shock absorber positioned between the corresponding upper clamping block and the yoke assembly, and a lower shock absorber. The first and second clamping mechanisms each further include a bolt coupled with the yoke assembly and holding the corresponding clamping blocks and shock absorbers in compression against the steering stem, such that the upper and lower clamping blocks are clamped into abutment against the upper and lower sides the steering stem. The first and second clamping mechanisms each further include an alignment key extending through the steering stem and coupling together the corresponding upper and lower clamping blocks.

In still another aspect, a kit for retrofitting a shock-absorbing handlebar mount to a steering stem in an off-road vehicle includes a package, and a handlebar mount within the package. The handlebar mount includes a yoke assembly configured to couple with a tubular section of a handlebar, and a first and a second clamping mechanism configured to attach the handlebar mount to the steering stem. The first and second clamping mechanisms each include an upper and a lower clamping block positionable in abutment against an upper and a lower side of the steering stem, respectively, an upper shock absorber positionable between the corresponding upper clamping block and the yoke assembly, and a lower shock absorber. Each of the upper and lower clamping blocks and the upper and lower shock absorbers defines a through-bore. The first and second clamping mechanisms each further include a bolt configured to couple the corresponding upper and lower clamping blocks and upper and lower shock absorbers to the yoke assembly, and to couple the handlebar mount to the steering stem. Each of the bolts defines a clamping axis extending between a first bolt end configured to couple with the yoke assembly, and a second bolt end, and being rotatable when received through the corresponding through-bores to clamp the steering stem between the corresponding upper and lower clamping blocks. The first and second clamping mechanisms each further include an alignment key configured to couple together the corresponding upper and lower clamping blocks to inhibit non-axial displacement thereof.

BRIEF DESCRIPTION OF THE DRAWINGS

FIG. 3 is a partially disassembled view of a handlebar mount, according to one embodiment; and FIG. 4 is a diagrammatic view of a handlebar mount packaged in the form of a retrofit kit, according to one embodiment.

DETAILED DESCRIPTION

Figure 1:
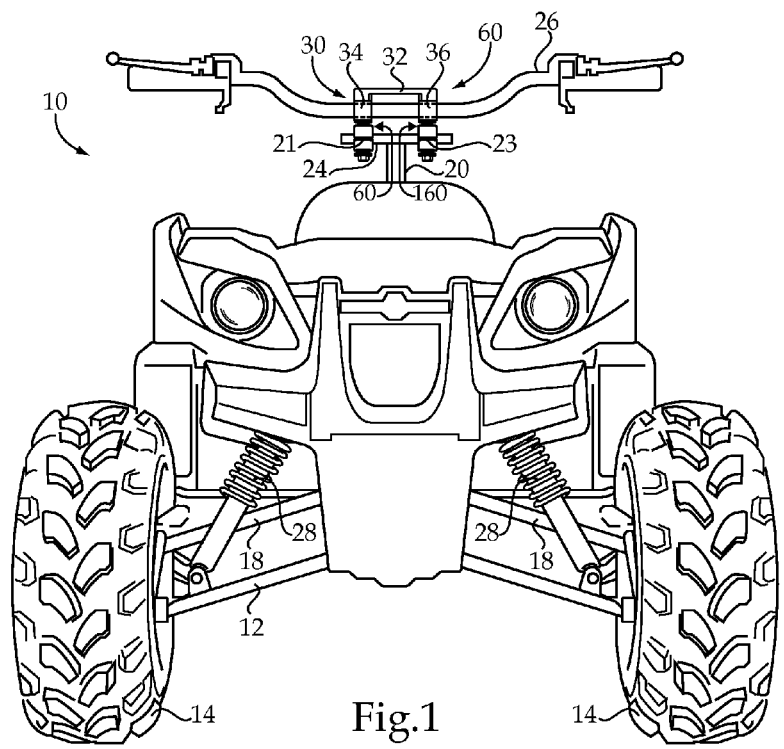
FIG. 1 is a front view of an off-road vehicle, according to one embodiment.

Referring to FIG. 1, there is shown an off-road vehicle 10 according to one embodiment, and illustrated in the context of a conventional four-wheel ATV. Vehicle 10 includes a frame 12, a front set of wheels 14, and a back set of wheels which are not visible in FIG. 1, coupled to frame 12. Vehicle 10 further includes a steering system 16, having a linkage 18 configured to pivot front wheels 14 in a conventional manner, and a steering stem 20 coupled to linkage 18. Steering stem 20 may be a stock steering stem provided as part of a production vehicle, and is shown as it might appear having had a stock handlebar and mounting assembly removed and retrofitted with a shock-absorbing handlebar mount 30. In the embodiment shown, stem 20 includes a first through-bore and a second through-bore 23 extending between an upper side 22 and a lower side 24 of stem 20. As will be further apparent from the following description, handlebar mount 30, and by virtue of its incorporation therein, steering system 16 is considered to provide advantages over known stock designs and retrofit strategies providing for shock absorption and vibration attenuation in steering systems for off-road vehicles.

Figure 2:
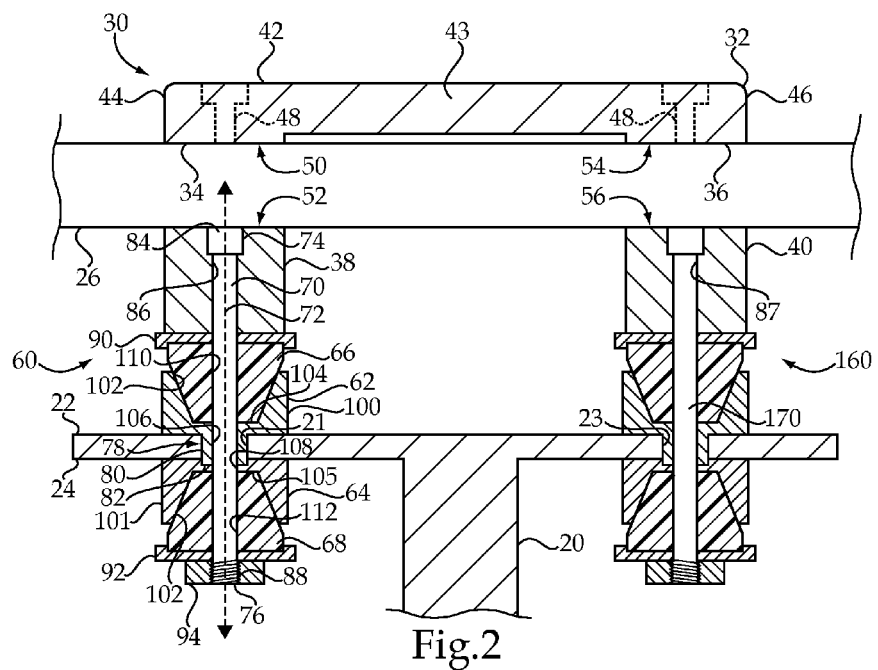
FIG. 2 is a partially sectioned front view through a portion of a steering system in the vehicle of FIG. 1.

Referring also now to FIG. 2, there is shown a sectioned view through a portion of vehicle 10 and illustrating handlebar mount 30, steering stem 20, and a tubular section of handlebar 26. Mount 30 may include a yoke assembly 32 defining a pair of coaxial bores 34 and 36 configured to receive the tubular section of handlebar 26 as shown. In a practical implementation strategy, yoke assembly 32 may be a three-piece yoke assembly, having a first body piece 38, a second body piece 40 and a connector bar 42. Connector bar 42 may have an elongate center section 43 extending between a first end 44 and a second end 46. A plurality of bolts 48, two of which are shown in phantom in FIG. 2 and an additional two of which are positioned behind the illustrated bolts 48 in FIG. 2, couple connector bar 42 to each of first and second body pieces 38 and 40. A first arcuate clamping surface 50 may be formed on first end 44 of connector bar 42 and a second arcuate clamping surface 54 may be formed on second end 46. A third arcuate clamping surface 52 may be formed on first body piece 38, and a fourth arcuate clamping surface 56 may be formed on second body piece 40, and are positioned in opposition to surfaces 50 and 54. Coaxial bores 34 and 36 my thus be defined in part by connector bar 42 and also in part by first and second body pieces 38 and 40. In alternative embodiments, yoke assembly 32 might include two pieces, such as by attaching or forming integrally first and second body pieces 38 and 40. In still other embodiments, connector bar 42 might be positioned below handlebar 26, and first and second body pieces 38 and 40 positioned above handlebar 26, an implementation that would generally reverse the positions of the components top to bottom from that shown in FIG. 2. In any event, most embodiments will include at least one one-piece connector bar such that loads may be shared between two clamping locations on the handlebar, whether the one piece connector bar is an upper piece or a lower piece.

Mount 30 may further include a first clamping mechanism 60 and a second clamping mechanism 160 coupled to yoke assembly 32 and configured to attach handlebar mount 30 to steering stem 20. Each of clamping mechanisms 60 and 160 may be substantially identical, and thus the following description of clamping mechanism 60 should be understood to similarly refer to clamping mechanism 160. Clamping mechanism 60 includes an upper clamping block 62 and a lower clamping block 64 positionable in abutment against upper side 22 and lower side 24 of stem 20, respectively. Clamping mechanism 60 further includes an upper shock absorber 66 positioned between upper clamping block 62 and yoke assembly 32, and a lower shock absorber 68. In the illustrated embodiment, each of shock absorbers 66 and 68 includes a frustoconical shape, and is one piece and formed of an elastomeric material such as polyurethane, or the like. Clamping mechanism 60 further includes a bolt 70 extending through upper and lower clamping blocks 62 and 64 and through upper and lower shock absorbers 66 and 68. Bolt 70 defines a clamping axis 72 extending between a first bolt end 74 coupled to yoke assembly 32, and a second bolt end 76. Bolt 70 is rotatable to clamp steering stem 20 between upper and lower clamping blocks 64 and 66. In the embodiment shown, bolt 70 includes a head 84 received in a vertical bore 86 formed in yoke assembly 32, in particular formed in body piece 38, and intersecting horizontal bore 34. Second end 76 includes an external thread 88 to which is coupled a nut 94. In alternative embodiments, bolt 70 might be reversed from the orientation shown and threadedly received within bore 86. A second vertical bore 87 formed in clamping block 40 receives a second bolt 170 of clamping mechanism 160, is parallel bore 86, and intersects bore 36. Clamping mechanism 60 further includes an upper washer 90 positioned between upper shock absorber 66 and yoke assembly 32, and a lower washer 92 positioned axially outward of lower shock absorber 68. Nut 94 may be internally threaded to enable its engagement with bolt 70.

In the assembled state shown in FIG. 2, bolt 70 holds clamping blocks 62 and 64 and shock absorbers 66 and 68 in compression against the upper and lower sides 22 and 24 of steering stem 20, such that upper and lower clamping blocks 62 and 64 are clamped into abutment against upper and lower sides 22 and 24. As noted above, bolt 70 extends through body piece 38, washer 90, shock absorber 66, upper clamping block 62, lower clamping block 64, lower shock absorber 68, lower washer 92, and nut 94, in the listed order in an upper to lower direction. Clamping block 62 may define a through-bore 106, clamping block 64 may define a through-bore 108, upper shock absorber 66 may define a through-bore 110, and lower shock absorber 68 may define a through bore 112, for receipt of bolt 70 as described. Each of clamping blocks 62 and 64 may further include a cylindrical outer peripheral surface 100 and 101, respectively, and a conical inner peripheral surface 102 and 103, respectively. Each of inner peripheral surfaces 102 and 103 may form a partially or wholly conical seat 104 and 105 in contact with the corresponding one of shock absorber 66 and 68.

Clamping mechanism 60 may further include an alignment key 78 coupling together upper and lower clamping blocks 62 and 64 to inhibit non-axial displacement thereof. In other words, key 78 may prevent side-to-side or shearing movement, between clamping blocks 62 and 64 and thus between shock absorbers 66 and 68 during transmitting shocks and vibrations between handlebar 26 and stem 20. Referring also now to FIG. 3, there is shown mount 30 with clamping mechanism 60 disassembled. In the embodiment illustrated, alignment key 78 includes a protrusion 80 formed on clamping block 62. Clamping block 64 includes a complementary keyway 82 formed therein and receiving protrusion 80 when mount 30 is assembled such as with steering stem 20. Protrusion 80 may include a cylindrical protrusion, and keyway 82 may include a cylindrical recess. Bolt 70 may extend through protrusion 80 and keyway 82 when mount 30 is assembled. Rather than a cylindrical shape, key 78 might be formed as a protrusion having a polygonal shape such that relative rotation between clamping block 62 and 64 is inhibited. In still other embodiments, rather than placing protrusion 80 on upper clamping block 62 and forming a recess in lower clamping block 64, the locations of the protrusion and recess might be reversed. A clearance between protrusion 80 and keyway 82 may be relatively tight, and in any event tighter than a clearance of bolt 70 in through-bore 106.

Referring now to FIG. 4, there is shown mount 30 in an assembled state and within a package 200 to form a retrofit kit 190. In certain embodiments, mount 30 may be sold fully assembled, and packaged, for instance with a cardboard backing and a transparent shrink-wrapped covering, so that a user will readily see and understand the manner in which mount 30 is to be assembled. To retrofit mount 30 to an off-road vehicle steering stem, it will typically be necessary only to loosen the nuts holding together the respective clamping mechanisms, remove the lower washer, shock absorbers, and lower clamping blocks, and then place mount 30 upon a stock steering stem in place of a removed handlebar mount, and reattach the removed components.

Apart from the shock absorbers, bolts and nuts, all of the parts of mount 30 may be formed from machined aluminum, providing for a lightweight and corrosion resistant mechanism. In contrast to certain known shock absorbing and antivibration handlebar mounting mechanisms, a relatively small number of parts, with straightforward geometry is provided. Rather than specialized mounting mechanisms or replacement stems which attempt to incorporate cups or seats for shock absorbers, bushings and the like into the stem structure, as well as aftermarket retrofit products which attempt to utilize the existing stem structure to seat the shock absorbers, the present disclosure provides clamping blocks with suitable geometry for such purposes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A shock-absorbing handlebar mount for an off-road vehicle comprising:
  a yoke assembly defining a pair of coaxial bores configured to receive a tubular section of a handlebar;
  a first and a second clamping mechanism coupled to the yoke assembly and configured to attach the handlebar mount to a steering stem in the off-road vehicle;
  the first and second clamping mechanisms each including an upper and a lower clamping block positionable in abutment against an upper and a lower side of the steering stem, respectively, an upper shock absorber positioned between the corresponding upper clamping block and the yoke assembly, and a lower shock absorber;
  the first and second clamping mechanisms each further including a bolt extending through the corresponding upper and lower clamping blocks and upper and lower shock absorbers, and each of the bolts defining a clamping axis extending between a first bolt end coupled to the yoke assembly, and a second bolt end, and being rotatable to clamp the steering stem between the corresponding upper and lower clamping blocks; and
  the first and second clamping mechanisms each further including an alignment key coupling together the corresponding upper and lower clamping blocks to inhibit non-axial displacement thereof.

2. The handlebar mount of claim 1 wherein each of the alignment keys includes a protrusion formed on one of the corresponding upper and lower clamping blocks, and the other of the corresponding clamping blocks includes a complementary keyway formed therein and receiving the protrusion.

3. The handlebar mount of claim 2 wherein each of the alignment keys includes a cylindrical protrusion, and each of the recesses includes a cylindrical recess, and wherein each of the bolts extends through the protrusion and recess in the corresponding upper and lower clamping blocks.

4. The handlebar mount of claim 2 wherein each of the shock absorbers includes a frustoconical shape, and each of the clamping blocks includes a conical seat receiving one of the shock absorbers.

5. The handlebar mount of claim 4 wherein each of the shock absorbers is one piece and is formed of an elastomeric material.

6. The handlebar mount of claim 5 wherein the first end of each one of the bolts includes a head received in a bore formed in the yoke assembly, and the second end of each one of the bolts includes an external thread.

7. The handlebar mount of claim 6 wherein each of the clamping mechanisms further includes an upper washer positioned between the corresponding upper shock absorber and the yoke assembly, a lower washer positioned axially outward of the corresponding lower shock absorber, and an internally threaded nut received on the external thread of the corresponding bolt.

8. The handlebar mount of claim 1 wherein the yoke assembly includes a first and a second body piece each having an arcuate clamping surface formed thereon, and an elongate connector bar having a center section extending between a first and a second end each having an arcuate clamping surface formed thereon and positioned in opposition to one of the arcuate clamping surfaces on the body piece, such that opposed pairs of the clamping surfaces define the first and second coaxial bores.

9. The handlebar mount of claim 8 wherein the first and second body pieces define a first and a second parallel bore, respectively, each intersecting one of the first and second coaxial bores.

10. A steering system for an off-road vehicle comprising:
  a steering stem configured to couple with a linkage for steering front wheels of the off-road vehicle, and having an upper and a lower side;
  a handlebar;
  a mount including a yoke assembly coupled to the handlebar, and a first and a second clamping mechanism attaching the yoke assembly to the steering stem;
  the first and second clamping mechanisms each including an upper and a lower clamping block, an upper shock absorber positioned between the corresponding upper clamping block and the yoke assembly, and a lower shock absorber;
  the first and second clamping mechanisms each further including a bolt coupled with the yoke assembly and holding the corresponding clamping blocks and shock absorbers in compression against the steering stem, such that the upper and lower clamping blocks are clamped into abutment against the upper and lower sides of the steering stem; and
  the first and second clamping mechanisms each further including an alignment key extending through the steering stem and coupling together the corresponding upper and lower clamping blocks.

11. The steering system of claim 10 wherein each of the alignment keys includes a protrusion formed on one of the upper and lower clamping blocks of each clamping mechanism, and the other of the corresponding upper and lower clamping blocks includes a keyway formed therein and receiving the protrusion.

12. The steering system of claim 11 wherein a first and a second through-bore are formed in the steering stem and each receive one of the cylindrical protrusions and one of the bolts.

13. The steering system of claim 12 wherein each of the clamping blocks includes a cylindrical outer peripheral surface, and a conical inner peripheral surface forming a seat in contact with one of the shock absorbers.

14. The steering system of claim 10 wherein the yoke assembly includes a three-piece yoke assembly defining a first and a second horizontal bore receiving the handlebar, and a first and a second vertical bore each intersecting one of the first and second horizontal bores and receiving one of the bolts.

15. A kit for retrofitting a shock-absorbing handlebar mount to a steering stem in an off-road vehicle comprising:
- a package;
- a handlebar mount within the package, and including a yoke assembly configured to couple with a tubular section of a handlebar, and a first and a second clamping mechanism configured to attach the handlebar mount to the steering stem;
- the first and second clamping mechanisms each including an upper and a lower clamping block positionable in abutment against an upper and a lower side of the steering stem, respectively, an upper shock absorber positionable between the corresponding upper clamping block and the yoke assembly, and a lower shock absorber;
- each of the upper and lower clamping blocks and the upper and lower shock absorbers defining a through-bore;
- the first and second clamping mechanisms each further including a bolt configured to couple the corresponding upper and lower clamping blocks and upper and lower shock absorbers to the yoke assembly, and to couple the handlebar mount to the steering stem;
- each of the bolts defining a clamping axis extending between a first bolt end configured to couple with the yoke assembly, and a second bolt end, and being rotatable when received through the corresponding through-bores to clamp the steering stem between the corresponding upper and lower clamping blocks; and
- the first and second clamping mechanisms each further including an alignment key configured to couple together the corresponding upper and lower clamping blocks to inhibit non-axial displacement thereof.

16. The kit of claim 15 further wherein each of the clamping mechanisms further includes a nut configured to couple to the second bolt end of the corresponding bolt, and a first and a second washer positionable axially outward of the corresponding upper and lower shock absorbers.

17. The kit of claim 16 wherein the yoke assembly includes a three-piece yoke assembly having a first and a second body piece, and an elongate connector bar coupled with each of the first and second body pieces, and the yoke assembly defining a pair of coaxial horizontal bores configured to receive the tubular section of the handlebar, and a pair of parallel vertical bores each intersecting one of the coaxial horizontal bores and configured to receive the first bolt end of the corresponding bolt.

18. The kit of claim 17 wherein each of the alignment keys includes a protrusion formed on one of the upper and lower clamping blocks of each clamping mechanism.

19. The kit of claim 18 wherein each of the protrusions includes a cylindrical protrusion.

* * * * *